United States Patent
Bolick et al.

(10) Patent No.: US 11,882,171 B2
(45) Date of Patent: Jan. 23, 2024

(54) INSTANCED WEB SERVERS FOR DISPLAYING CUSTOM CONTENT IN A SECURE CONTEXT

(71) Applicant: Avast Software s.r.o., Prague (CZ)

(72) Inventors: Danny Bolick, Hudson, NC (US); Stewart Thomas, Fort Walton Beach, FL (US)

(73) Assignee: AVAST SOFTWARE S.R.O., Prague (CZ)

( * ) Notice: Subject to any disclaimer, the term of this patent is extended or adjusted under 35 U.S.C. 154(b) by 0 days.

(21) Appl. No.: 16/147,659

(22) Filed: Sep. 29, 2018

(65) Prior Publication Data

US 2019/0104166 A1    Apr. 4, 2019

Related U.S. Application Data

(60) Provisional application No. 62/566,135, filed on Sep. 29, 2017.

(51) Int. Cl.
| | |
|---|---|
| *H04L 67/02* | (2022.01) |
| *G06F 16/951* | (2019.01) |
| *G06F 16/958* | (2019.01) |
| *G06F 16/955* | (2019.01) |
| *G06F 21/64* | (2013.01) |
| *G06F 21/44* | (2013.01) |
| *H04L 9/40* | (2022.01) |
| *H04L 67/563* | (2022.01) |

(52) U.S. Cl.
CPC ............ *H04L 67/02* (2013.01); *G06F 16/951* (2019.01); *G06F 16/958* (2019.01); *G06F 16/9566* (2019.01); *G06F 21/44* (2013.01); *G06F 21/64* (2013.01); *H04L 63/164* (2013.01); *H04L 67/563* (2022.05); *H04L 2463/081* (2013.01)

(58) Field of Classification Search
CPC ........... H04L 61/1511; H04L 29/12066; H04L 63/1416; H04L 63/0227; H04L 63/0236; H04L 63/10; H04L 67/306; G06F 2221/2119; G06F 21/56; G06F 16/9566
See application file for complete search history.

(56) References Cited

U.S. PATENT DOCUMENTS

| | | | |
|---|---|---|---|
| 8,458,351 B2 | 6/2013 | Mcmahan et al. | |
| 8,838,773 B1 | 9/2014 | Sekhar et al. | |
| 9,992,086 B1* | 6/2018 | Mizik | ..................... H04L 43/20 |
| 2004/0168121 A1 | 8/2004 | Matz | |
| 2008/0250484 A1 | 10/2008 | Chong et al. | |
| 2011/0282997 A1* | 11/2011 | Prince | ................... G06F 16/958 |
| | | | 709/226 |

(Continued)

FOREIGN PATENT DOCUMENTS

WO    0133371 A1    5/2001

*Primary Examiner* — Hitesh Patel
(74) *Attorney, Agent, or Firm* — AVEK IP, LLC; Mark C. Young; William B. Kircher

(57) ABSTRACT

Systems and methods receiving an indication that a domain has been blocked. A temporary web server is created that has network address that is different from the network address associated with the blocked domain. Content is created that indicates the blocked domain, and optionally, a reason for the blocking. The network address of the temporary web server is returned to a requesting browser application, which can display the content without providing a security warning.

24 Claims, 4 Drawing Sheets

(56) References Cited

U.S. PATENT DOCUMENTS

| | | | |
|---|---|---|---|
| 2011/0307541 A1* | 12/2011 | Walsh | H04L 67/1034 |
| | | | 709/203 |
| 2012/0023593 A1 | 1/2012 | Puder et al. | |
| 2012/0222106 A1* | 8/2012 | Kuehl | H04L 63/02 |
| | | | 726/11 |
| 2013/0067591 A1 | 3/2013 | Chou et al. | |
| 2014/0066110 A1* | 3/2014 | Lovegreen | G07F 17/242 |
| | | | 455/466 |
| 2015/0026341 A1* | 1/2015 | Blacka | H04L 63/168 |
| | | | 709/225 |
| 2015/0381653 A1* | 12/2015 | Starink | H04L 63/0281 |
| | | | 726/22 |
| 2016/0294933 A1* | 10/2016 | Hong | G06F 9/00 |
| 2018/0241767 A1* | 8/2018 | Crabtree | G06F 11/3495 |

\* cited by examiner

INSTANCED WEB SERVERS FOR DISPLAYING CUSTOM CONTENT IN A SECURE CONTEXT

CROSS-REFERENCE TO RELATED APPLICATIONS

This application claims the priority benefit of U.S. Provisional Application Ser. No. 62/566,135, filed on Sep. 29, 2017, entitled "INSTANCED WEB SERVERS FOR DISPLAYING CUSTOM CONTENT IN A SECURE CONTEXT," the entire disclosure of which is incorporated herein by reference.

FIELD

The disclosure relates generally to computing systems, and more particularly, to instancing web servers to display custom content in a secure context.

BACKGROUND

The Internet Protocol (IP) is the dominant network protocol used on the Internet. Two version of IP are currently in use, IPv4 (IP version 4) and its successor, IPv6 (IP version 6). Computing systems that use IP to communicate are assigned an IP address. An IPv4 address is a 32 bit value that is unique within the network. It is common to represent IPv4 addresses in a dotted notation having four 8 bit components. For example, an IPv4 address may be 192.168.0.1. An IPv6 address is a 128 bit integer that is unique within a network. IPv6 addresses are typically represented as eight groups of four hexadecimal digits with the groups being separated by colons, for example 2001:0db8:0000:0042:0000:8a2e:0370:7334. Clearly, such numeric addresses are hard for users to remember. Therefore, IP addresses can be mapped to more easily remembered names. For example, the IP address 46.4.67.14 may be associated with "avast.com." The Domain Name System (DNS) is a decentralized system in which domain names are translated to their associated Internet Protocol address. Each domain has an authoritative name server (A DNS server) that publishes information about the domain and lower level name servers in the domain.

A DNS server can be configured to block certain sites and/or domains. For example, a DNS server can be configured to block sites based on their content (e.g., pornography). Further, a DNS server can be configured to block sites based on a likelihood that the site distributes malware, or is a known phishing site. Some security platforms can be configured to display alternative content when a site is blocked. However, if the blocked site uses HTTPS/SSL, the user's browser may display a browser security warning because the alternative content does not have the proper security credentials. As a result, the alternative content may appear to the user to be untrustworthy.

BRIEF DESCRIPTION OF THE DRAWINGS

For a better understanding of the disclosure, reference may be made to the accompanying drawings in which.

DETAILED DESCRIPTION

Figure 1:
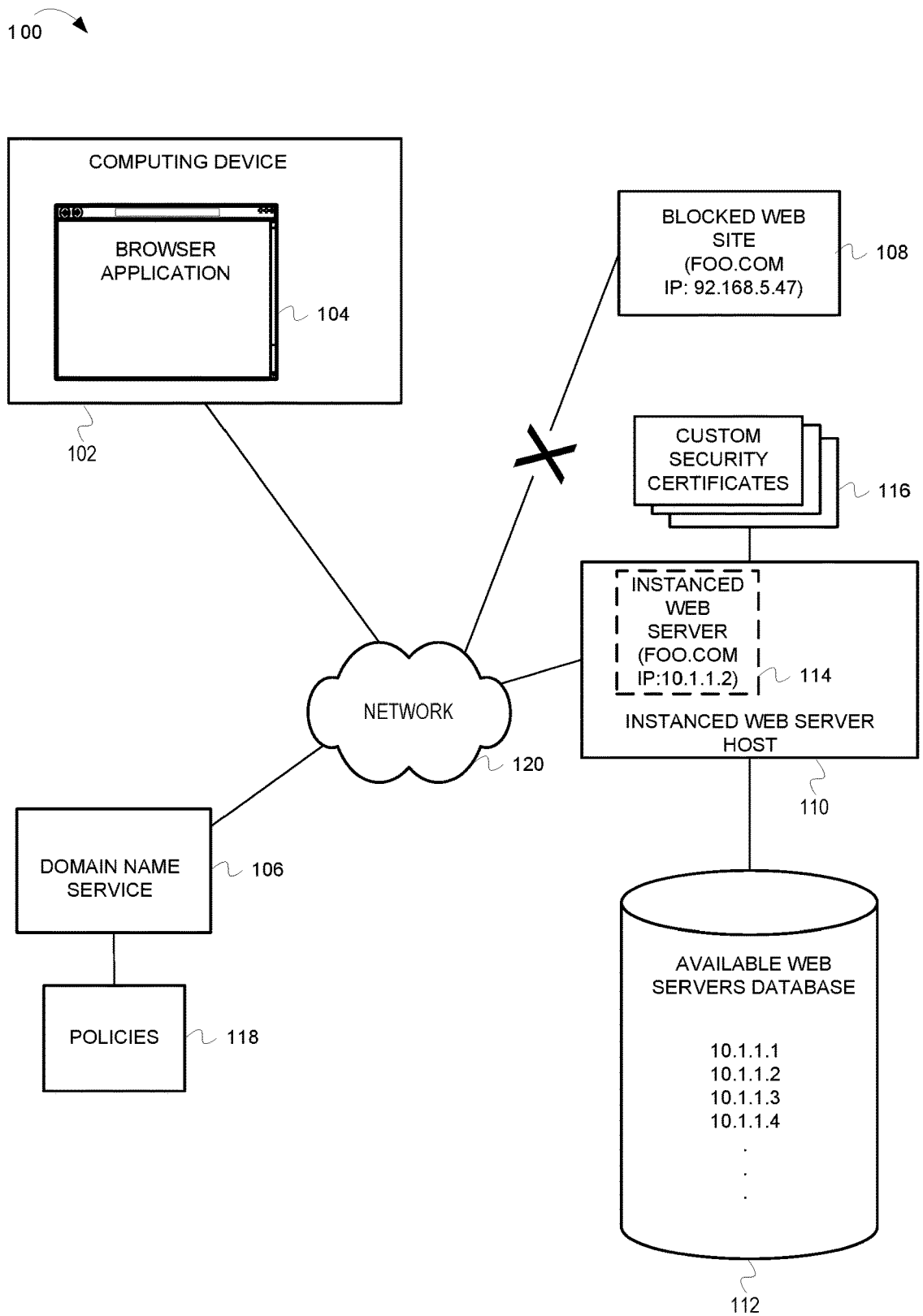
FIG. 1 is a block diagram illustrating a system for instancing web servers to display custom content in a secure context according to embodiments.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

The embodiments provide a way to display customized security notices to users who have been blocked from viewing an HTTPS/SSL page. The customized security notice can be displayed without any unnecessary security warnings from the user's browser. Thus, the displayed security notices can be treated by the user as legitimate because they are not accompanied by browser security warnings.

FIG. 1 is a block diagram illustrating a system 100 for instancing web servers to display custom content in a secure context according to embodiments. In some aspects, system 100 includes a computing device 102, domain name service 106, blocked web site 108, and instanced web server host 110, all coupled via network 120. Network 120 can be any type and combination of wired and wireless networks. In some aspects, network 120 can be the Internet.

Computing device 102 can be any type of device with one or more processors to execute software programs. Examples of such devices include a desktop computer, server computer, laptop computer, tablet computer, mainframe computer, smart phone, personal digital assistant, set top box, video game console, or any other computing device capable of executing at least some portion of the methods described herein.

Computing device 102 can execute a browser application 104. Browser application 104 is configured to retrieve and present information provided by information resources such as web servers. Web pages hosted by the web servers accessed by browser application 104 can present text, images, video, audio or other types of content. Browser application 104 can be any type of web browser application such as MICROSOFT® INTERNET EXPLORER®, MICROSOFT EDGE™, GOOGLE® CHROME®, MOZILLA® FIREFOX®, APPLE® SAFARI® etc. The embodiments are not limited to any particular browser application.

Domain name service 106 provides domain name services to client systems such as computing device 102. For example, computing device 102 may issue a query for an IP address associated with a domain name (e.g., "foo.com"). Domain name service 106 receives the query and provides an IP address associated with the domain name in response to the query. In some embodiments, domain name service 106 can be configured to determine whether or not a particular domain name should be blocked. For example, domain name service 106 can consult policies 118 that can include rules, lists or other data for use by domain name service 106 in determining whether or not a domain name should be blocked. The policies may be based on content provided by the domain or security threats (e.g., malware) presented by the domain.

Blocked web site 108 can be a domain that has been blocked by domain name service 106. For example, blocked web site 108 may have been blocked because it is a known phishing site, because it provides content that is considered harmful, distasteful, untrustworthy or for other reasons as may be determined by domain name service 106.

Instanced web server host 110 is a computer or distributed computing system that can execute some or all of the methods described herein. While instanced web server host 110 will typically be a server computer, instanced web server host 110 can be any type of device with one or more processors, and can also include desktop computers, laptop computers, tablet computers, mainframe computers, smart phones, personal digital assistants, and set top boxes. Instanced web server host 110 can be configured to provide an instanced web server 114 to replace a domain that has been blocked (e.g., blocked web site 108). The instanced web server 114 can be temporary, e.g., it can be created in response to detecting that a browser application 104 has attempted to access a blocked web site 108, and can exist long enough to display a customized web page to the browser application in place of the content that would have been provided by blocked web site 108. The instanced web server 114 can then be destroyed, and the resources used by instanced web server 114 can be made available for other processes or other instanced web servers.

Instanced web server host 110 can maintain an available web servers database that includes information as to IP addresses, status, and other information that can be used to create an instanced web server 114.

Instanced web server host 110 can maintain or create custom security certificates 116 for use with instanced web servers.

An example of the operation of system 100 will now be presented. Assume that a browser application 104 has made a request for a web site having a domain name of "foo.com," where the actual IP address associated with the domain is 92.168.5.47. In order to complete the request, the browser application needs to obtain the IP address associated with the domain "foo.com," and issues a DNS request to DNS 106. DNS 106 determines that the domain "foo.com" has been blocked. In response, instanced web server host 110 creates an instanced web server, determines that the IP address 10.1.1.2 is available, and assigns the IP address 10.1.1.2 to the web server. The instanced web server host 110 then causes the DNS 106 to provide 10.1.1.2 as the address of "foo.com" instead of the actual IP address 92.168.5.47. The browser application 104 then issues a request for content from the web site. Instead of receiving content from the blocked web site, browser application 104 receives block page html from instanced web server 114. The content can include information such as identifying that "foo.com" has been blocked, the actual IP address of foo.com, and the reason(s) for blocking foo.com. After the block page html content has been served, the instanced web server 114 can be destroyed and its resources made available for other instanced web servers.

Further details on the operation of the above described system 100 are provided below with respect to FIGS. 2 and 3. The operations of the methods illustrated in FIGS. 2 and 3 may, in some aspects, constitute computer programs made up of computer-executable instructions. Describing the methods by reference to flowcharts enables one skilled in the art to develop such programs including such instructions to carry out the methods on suitable processors (the processor or processors of the computer executing the instructions from computer-readable media). The methods illustrated in FIGS. 2 and 3 are inclusive of acts that may be taken by an operating environment executing example embodiments of the present invention.

Figure 2:
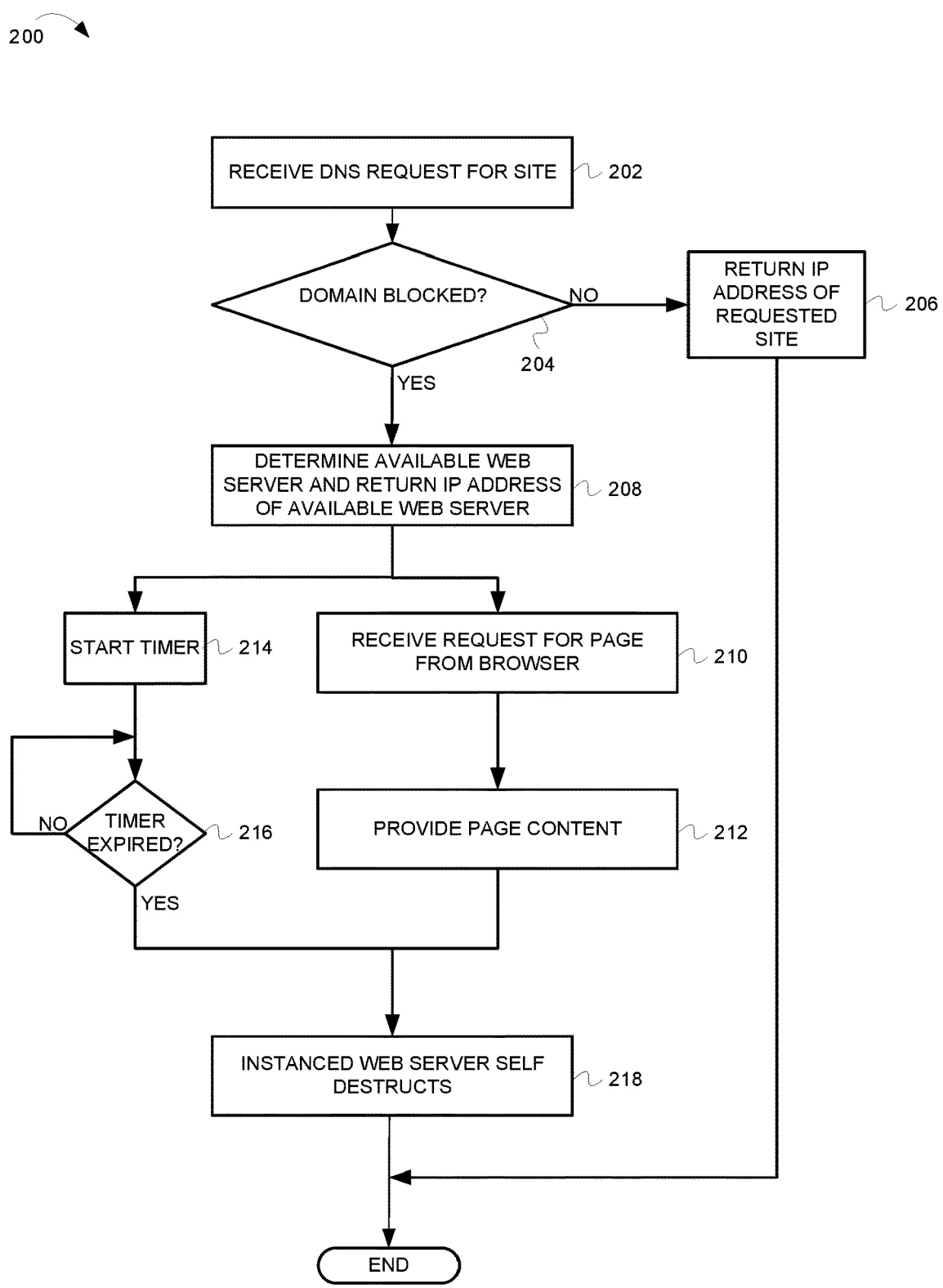
FIG. 2 is a flow chart illustrating operations of a method for instancing web servers to display custom content in a secure context according to embodiments.
Figure 3:
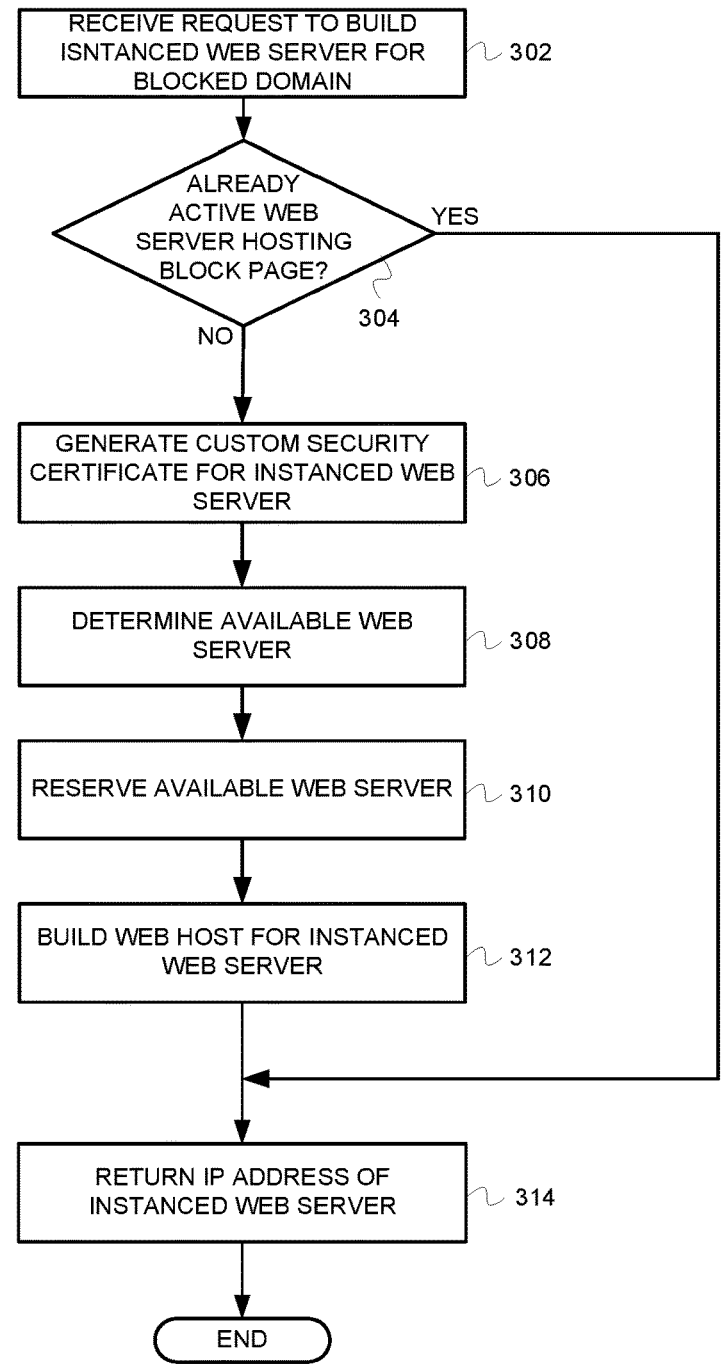
FIG. 3 is a flow chart illustrating further details on the operations of a method for instancing web servers to display custom content in a secure context according to embodiments.

FIG. 2 is a flow chart 200 illustrating operations of a method for instancing web servers to display custom content in a secure context according to embodiments. At block 202, a DNS request can be received by a domain name service from a computing device to obtain the IP address associated with a domain.

At block 204, the domain name service can determine if the domain specified in the request is a blocked domain. The domain name service can use rules, heuristics, and/or data to determine if the requested domain is blocked.

If the domain is not blocked, then at block 206, the IP address of the requested domain is returned to the requestor. The method then ends.

If the domain name service determines at block 204 that the requested domain is blocked, then at block 208, an instanced web server host can determine that resources are available (e.g., an IP address to use for an instanced web server) and an instanced web server can be created. The IP address associated with the newly created instanced web server can be returned to the computing device making the original request.

Blocks 210-212 and blocks 214-16 can be processed in parallel as shown in FIG. 2.

At block 210, a request for a page on the blocked domain is received from a browser application by the instanced web server created at block 208.

At block 212, the instanced web server provides page content to the browser application. The page content can indicate that the requested domain was blocked, and can provide other information regarding the blocked domain. For example, the reason or reasons that the domain is blocked can be provided to the browser application.

At block 214, a timer can be started after an instanced web server is created. The timer interval can be set such that the instanced web server is still present when a request for page content of the blocked domain is received, and that the instanced web server can be destroyed in a timely manner in order to prevent unnecessary use of resources should a request never arrive. In some embodiments, the timer interval can be X milliseconds. The value for X can be configurable by a system administrator. Additionally, the value for X can be dynamically adjusted. As an example, if the number of available IP addresses for assignment to an instanced web server is relatively low (e.g., four) and there are a large number of users, the value of X may be low (e.g., 5000 ms). Alternatively, if there are a relatively high number of available IP addresses for instanced web servers (e.g., 100), the value could of X could be increased.

The timer can be checked at block 216 to determine if the timer has expired.

Block 218 can be reached either because the instanced web server provided page content at block 212, or upon expiration of the timer started at block 214. At block 218, the instanced web server can be destroyed and its resources made available for other purposes, such as creating other instanced web servers. The method then ends.

FIG. 3 is a flow chart 300 illustrating further details on the operations of a method for instancing web servers to display custom content in a secure context according to embodiments. More particularly, the operations illustrated in FIG. 3 provide further details on the operations performed by instanced web server host 110 (FIG. 1) in response to a DNS determining that a domain in a request has been blocked.

At block 302, a request is received to create an instanced web server in order to display content and/or user information to replace the content provided by a blocked web site.

At block 304, the web server host determines if an instanced web server is already active for the blocked domain. If so, then the method proceeds to block 314, where the IP address of the already active instanced web server is returned to the requestor. In addition, the timer can be reset (see FIG. 2, block 214 above).

At block 306, the web server host can create a custom security certificate using a provided root certificate, which in some embodiments, has also been distributed to the user. For example, the root certificate can be provided to a user as part of an initial setup that enables a user to access the services provided by the system.

At block 308, an available instanced web server is located. For example, the system can check to determine than an IP address from a pool of IP addresses reserved for instanced web servers is available.

At block 310, the available instanced web server is reserved. In some embodiments, reserving an instanced web server can include setting a "self destruct" timer to cause the instanced web server to be unreserved and its resources made available for other purposes. Further, reserving an instanced web server can include creating block page html content can be created. The block page html content is the content that replaces the content that would otherwise have been provided by the blocked web site. In some embodiments, the block page html content can include the address, URL and/or other identifiers associated with the blocked domain, and can, in some embodiments, include a reason for blocking the domain.

At block 312, software infrastructure for a web host is built to host the instanced web server. The web host can be associated with the certificate created at block 306. Further, the IP address reserved and assigned to the instanced web server (from the available web server database) can be associated with the web host. The web host can start the instanced web server.

The block page content may include shared resources such as images, fonts, scripts etc. that are presented for display by a browser application 104 regardless of the blocked domain. Upon startup, the instanced web server can customize it's references to images, fonts and other resources referenced in the Block Page HTML, so that they all reference the blocked domain in order to prevent browser warnings. For example, the block page content that is to be displayed by a browser application 104 in the event a domain is blocked can include references to images, fonts, scripts, and other resources. The references to these resources in the Block Page HTML can be set in the Block Page HTML to refer to the blocked domain. For example, if the domain name "foo.com" has been blocked, a reference to a logo image (logo.png) that is part of a template for the block page content can be modified in the Block Page HTML to be "http://foo.com/images/logo.png." If a subsequent blocked domain "bar.com" is to be handled, then the instanced web server can customize the reference to be "http://bar.com/images/logo.png." This ensures that the browser application 104 believes that all of the content in the HTML comes from the blocked domain (foo.com, bar.com) and thus determines that the reference is valid, so that no security warning is presented by the browser application in response to receiving the Block Page HTML from the instanced web server.

In response to a page request for the blocked domain, the block page html created at block 310 can be modified to reference http or https to align with the type of request coming in.

At block 314, the IP address of the web server can be provided to the browser application.

At noted above, the instanced web server can self destruct. This can occur in response to the block page content being served to a browser application 104, or in response to the expiration of a timer. In some embodiments, the instanced web server can modify (i.e., shorten) the timer interval after the block page html has been served, so that the web server can be destroyed earlier than originally specified when the instanced web server was created. Destruction of the instanced web server can include the instanced web server and its resourced re-entering a pool of available web servers.

It should be noted that while the above discussion has been presented in the context of browser applications, the inventive subject matter is not limited to browser applications. The inventive concepts described herein can be applied to any application communicating on the Internet using a domain name.

Figure 4:
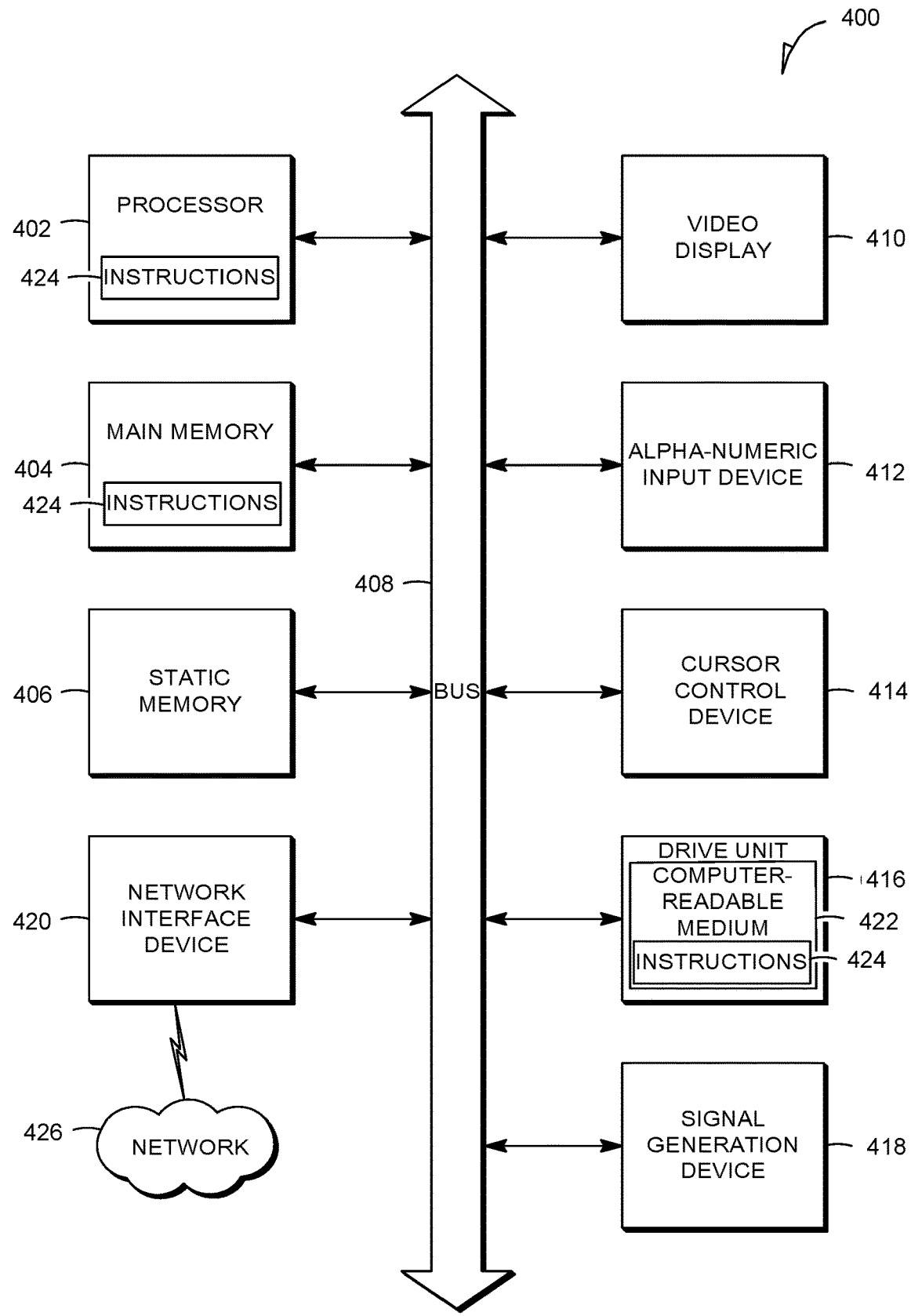
FIG. 4 is a block diagram of an example embodiment of a computer system upon which embodiments of the inventive subject matter can execute.

FIG. 4 is a block diagram of an example embodiment of a computer system 400 upon which embodiments of the inventive subject matter can execute. The description of FIG. 4 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

Moreover, those skilled in the art will appreciate that the aspects of the disclosure may be practiced with other computer system configurations, including hand-held devices, multiprocessor systems, microprocessor-based or programmable consumer electronics, smart phones, network PCs, minicomputers, mainframe computers, and the like. Aspects of the disclosure may also be practiced in distributed computer environments where tasks are performed by I/O remote processing devices that are linked through a communications network. In a distributed computing environment, program modules may be located in both local and remote memory storage devices.

With reference to FIG. 4, an example embodiment extends to a machine in the example form of a computer system 400 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 400 may include a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). In example embodiments, the computer system 400 also includes one or more of an alpha-numeric input device 412 (e.g., a keyboard), a user interface (UI) navigation device or cursor control device 414 (e.g., a mouse), a disk drive unit 416, a signal generation device 418 (e.g., a speaker), and a network interface device 420.

The disk drive unit 416 includes a machine-readable medium 422 on which is stored one or more sets of instructions 424 and data structures (e.g., software instructions) embodying or used by any one or more of the methodologies or functions described herein. The instructions 424 may also reside, completely or at least partially, within the main memory 404 or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 424 may further be transmitted or received over a communications network 426 using a signal transmission medium via the network interface device 420 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

In the claims below, certain elements may be labeled with a lower letter. Such labeling is merely for convenience in referring to the elements in dependent claims. No ordering of elements is intended or required by such labeling.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method comprising:
    receiving an indication that a domain comprises a blocked domain, the blocked domain associated with a first network address;
    creating a temporary web server in response to said receiving the indication, the temporary web server having a second network address different from the first network address associated with the blocked domain;
    creating block page content for the temporary web server;
    returning the second network address to a browser application requesting a web site of the blocked domain, wherein the browser application is configured to display the block page content without providing a security warning; and
    in response to the block page content being served to the browser application, destroying the temporary web server.

2. The method of claim 1, wherein creating block page content includes setting references to one or more shared resources used in the block page content to refer to the blocked domain.

3. The method of claim 1, further comprising:
    generating a security certificate based, at least in part, on a root certificate; and
    associating the temporary web server with the security certificate.

4. The method of claim 3, further comprising providing the root certificate to a client system prior to the client system issuing a request for the blocked domain.

5. The method of claim 1, wherein creating the block page content includes identifying the blocked domain and information indicating a reason for blocking the domain in the block page content.

6. The method of claim 1, further comprising destroying the temporary web server in response to determining that the block page content has been provided to the browser application.

7. The method of claim 1, further comprising destroying the temporary web server in response to expiration of a timer associated with the temporary web server.

8. The method of claim 1, further comprising:
    receiving a second request for the first network address associated with the blocked domain; and
    in response to determining that the temporary web server already exists for the blocked domain, resetting an interval timer associated with the creation of the temporary web server and returning the second network address to a source of the second request.

9. A non-transitory machine-readable storage medium having stored thereon computer-executable instructions for providing instanced web servers, the computer-executable instructions to cause one or more processors to perform operations comprising:
    receive an indication that a domain comprises a blocked domain, the blocked domain associated with a first network address;
    create a temporary web server in response to said receiving the indication, the temporary web server having a second network address different from the first network address associated with the blocked domain;
    create block page content for the temporary web server;
    return the second network address to a browser application requesting a web site of the blocked domain, wherein the browser application is configured to display the block page content without providing a security warning; and
    destroy the temporary web server in response to the block page content being served to the browser application.

10. The non-transitory machine-readable storage medium of claim 9, wherein the computer-executable instructions to create the block page content includes computer-executable instructions to set references to one or more shared resources used in the block page content to refer to the blocked domain.

11. The non-transitory machine-readable storage medium of claim 9, wherein the computer-executable instructions further comprise computer executable instructions to:
    generate a security certificate based, at least in part, on a root certificate; and
    associate the temporary web server with the security certificate.

12. The non-transitory machine-readable storage medium of claim 11, wherein the computer-executable instructions further comprise computer executable instructions to:
    provide the root certificate to a client system prior to the client system issuing a request for the blocked domain.

13. The non-transitory machine-readable storage medium of claim 9, wherein the computer-executable instructions to create the block page content further comprise computer executable instructions to:
    identify the blocked domain and information indicating a reason for blocking the domain in the block page content.

14. The non-transitory machine-readable storage medium of claim 9, wherein the computer-executable instructions further comprise computer executable instructions to:
    destroy the temporary web server in response to a determination that the block page content has been provided to the browser application.

15. The non-transitory machine-readable storage medium of claim 9, wherein the computer-executable instructions further comprise computer executable instructions to:
    destroy the temporary web server in response to expiration of a timer associated with the temporary web server.

16. The non-transitory machine-readable storage medium of claim 9, wherein the computer-executable instructions further comprise computer executable instructions to:
    receive a second request for the first network address associated with the blocked domain; and
    in response to a determination that the temporary web server already exists for the blocked domain, reset an interval timer associated with the creation of the temporary web server and return the second network address to a source of the second request.

17. An apparatus comprising:
    one or more processors; and
    a machine-readable storage medium having stored thereon computer-executable instructions for providing instanced web servers, the computer-executable instructions to cause the one or more processors to perform operations comprising:

receive an indication that a domain comprises a blocked domain, the blocked domain associated with a first network address;

create a temporary web server in response to said receiving the indication, the temporary web server having a second network address different from the first network address associated with the blocked domain;

create block page content for the temporary web server;

return the second network address to a browser application requesting a web site of the blocked domain, wherein the browser application is configured to display the block page content without providing a security warning; and in response to the block page content being served to the browser application, destroy the temporary web server.

18. The apparatus of claim 17, wherein the computer-executable instructions to create the block page content includes computer-executable instructions to set references to one or more shared resources used in the block page content to refer to the blocked domain.

19. The apparatus of claim 17, wherein the computer-executable instructions further comprise computer executable instructions to:

generate a security certificate based, at least in part, on a root certificate; and associate the temporary web server with the security certificate.

20. The apparatus of claim 19, wherein the computer-executable instructions further comprise computer executable instructions to:

provide the root certificate to a client system prior to the client system issuing a request for the blocked domain.

21. The apparatus of claim 17, wherein the computer-executable instructions to create the block page content further comprise computer executable instructions to:

identify the blocked domain and information indicating a reason for blocking the domain in the block page content.

22. The apparatus of claim 17, wherein the computer-executable instructions further comprise computer executable instructions to:

destroy the temporary web server in response to a determination that the block page content has been provided to the browser application.

23. The apparatus of claim 17, wherein the computer-executable instructions further comprise computer executable instructions to:

destroy the temporary web server in response to expiration of a timer associated with the temporary web server.

24. The apparatus of claim 17, wherein the computer-executable instructions further comprise computer executable instructions to:

receive a second request for the first network address associated with the blocked domain; and in response to a determination that the temporary web server already exists for the blocked domain, reset an interval timer associated with the creation of the temporary web server and return the second network address to a source of the second request.

* * * * *